US005465821A

United States Patent [19]

Akioka

[11] Patent Number: 5,465,821

[45] Date of Patent: Nov. 14, 1995

[54] SHEET DISCRIMINATING APPARATUS

[75] Inventor: Takao Akioka, Sanda, Japan

[73] Assignee: Laurel Bank Machine Co., Ltd., Tokyo, Japan

[21] Appl. No.: 197,488

[22] Filed: Feb. 16, 1994

[30] Foreign Application Priority Data

Feb. 18, 1993 [JP] Japan .................................... 5-029121

[51] Int. Cl.[6] ................................ G07F 7/04; G06K 9/28

[52] U.S. Cl. ............................................ 194/207; 382/135

[58] Field of Search .................................... 194/205, 206, 194/207; 382/135, 318

[56] References Cited

U.S. PATENT DOCUMENTS

| | | | |
|---|---|---|---|
| 5,236,072 | 8/1993 | Cargill | 194/207 |
| 5,309,515 | 5/1994 | Troung et al. | 382/135 |
| 5,363,949 | 11/1994 | Matsubayashi | 382/135 X |

FOREIGN PATENT DOCUMENTS

| | | | |
|---|---|---|---|
| 0078708 | 5/1983 | European Pat. Off. | 194/207 |
| 3-44793 | 2/1991 | Japan | 194/207 |
| 5101248 | 4/1993 | Japan | 194/207 |

OTHER PUBLICATIONS

"Design for measuring dimensions/surface defects", Special Manufacture of Light Sensor Interface, pp. 169–173, Mar. 1989.

*Primary Examiner*—Michael S. Huppert
*Assistant Examiner*—Scott L. Lowe
*Attorney, Agent, or Firm*—Cushman, Darby & Cushman

[57] ABSTRACT

A sheet discriminating apparatus includes a plurality of light emitting elements arranged in a plurality of lines perpendicular to a sheet conveyance direction. A plurality of light receiving elements are positioned so that each faces an associated one of the light emitting elements. When a sheet is conveyed by the light emitting elements, at least one of the light receiving elements is partially screened by the side edge of the sheet. Length detection circuitry is provided for detecting the length of the sheet in a direction perpendicular to the conveyance direction based upon outputs of the light receiving elements. Also, pattern detection circuitry is provided for determining pattern data of the sheet based upon outputs of the light receiving elements. The determined pattern data is compared to stored, reference pattern data. The outcome of the comparison and the determined length are used to discriminate the kind of sheet.

17 Claims, 10 Drawing Sheets

SHEET DISCRIMINATING APPARATUS

FIELD OF THE INVENTION

The present invention relates to a sheet discriminating apparatus to be installed in a sheet counting machine or the like for discriminating sheets such as bills or bank notes (hereinafter referred to collectively as "bills") by kind.

DESCRIPTION OF PRIOR ART

There are known sheet discriminating apparatuses for discriminating among kinds of sheets by detecting the length of the sheets in the direction perpendicular to the sheet conveyance direction. For example, Japanese Utility Model Application laid open No. 63-80682 discloses a sheet discriminating apparatus using a CCD line sensor as light receiving elements arranged in the direction perpendicular to the sheet conveyance direction. In this sheet discriminating apparatus, the outputs of the line sensor are digitized for storage in a memory as image data. After the storage of the image data for the number of lines necessary for discriminating the kind of sheet, but before discrimination by use of pattern matching, the kind of sheet is preliminarily determined by detecting its length in the direction perpendicular to the conveyance direction. On the other hand, a characterizing area having a distinctive characteristic suitable for discriminating the kind of sheet is determined beforehand for each kind of sheet, and the position of the characterizing area in the sheet is stored in the memory for each kind of sheet. The pattern corresponding to the characterizing area is also stored in the memory as reference pattern data for each kind of sheet. After the preliminary determination of the kind of sheet, the final discrimination of the kind of sheet is conducted by extracting the image data of the characterizing area from the sheet and comparing it with the reference pattern data for the kind of sheet preliminarily determined.

There has also been proposed an alternative version of sheet discriminating apparatus which uses conventional photodiodes as the light receiving elements arranged in the form of an array and discriminates the kind of sheet by detecting the length of the sheet and the pattern thereof.

However, the conventional sheet discriminating apparatus using the CCD line sensor as the light receiving elements is inevitably very expensive because of the high cost of the CCD line sensor.

The cost can be reduced by using the conventional photodiodes as the light receiving elements. However, with photodiodes it is not possible to obtain the short intervals between adjacent light emitting elements and between adjacent light receiving elements that are necessary for accurately detecting the length of the sheet. As a result, the light emitted from a given light emitting element may be received by light receiving elements other than the associated light receiving element. Consequently, such an apparatus can not accurately detect the length of the sheet or the pattern thereof.

SUMMARY OF THE INVENTION

It is therefore an object of the present invention to provide a sheet discriminating apparatus which can accurately discriminate sheets by kind and can be manufactured at low cost.

The above and other objects of the present invention can be accomplished by a sheet discriminating apparatus for discriminating sheets by kind comprising a plurality of light emitting elements arranged in a plurality of lines in the direction perpendicular to a sheet conveyance direction, a plurality of light receiving elements each positioned to face an associated one of said light emitting elements, each of said light receiving elements receiving light emitted from the associated light emitting element, said light receiving elements being arranged such that at least one light receiving element receives light emitted from said associated light emitting element and is partially screened by the side edge of the conveyed sheet, a sheet length detecting means for detecting the length of the sheet in the direction perpendicular to said conveyance direction based upon the ratio of the outputs of the light receiving elements which are completely screened by the conveyed sheet to those of other light receiving elements which are partially screened by said conveyed sheet, and a pattern comparing means for determining pattern data of said sheet in accordance with time series outputs of said light receiving elements and for comparing said pattern data with a reference pattern data selected from a plurality of reference pattern data each corresponding to a kind of sheet, said kind of sheet being discriminated in accordance with the length of the sheet detected by said sheet length detecting means and the result obtained by said pattern comparing means.

In a preferred aspect of the present invention, said sheet length detecting means is arranged so as to detect the lengths of the portions of the light receiving means which are partially screened by said conveyed sheet in accordance with said ratios of the outputs of the light receiving elements which are completely screened by the conveyed sheet to those of said light receiving elements which are partially screened by said conveyed sheet, and to detect the length of said sheet in the direction perpendicular to said conveyance direction in accordance with the lengths of said light receiving elements which are completely screened by said conveyed sheet and said the lengths of the portions.

In another preferred aspect of the invention, said sheet length detecting means includes first circuits arranged such that each first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

In a further preferred aspect of the invention, said sheet discriminating apparatus further comprises a multiplexer means having a plurality of inputs and a single output for selectively outputting signals from said light receiving elements to said sheet length detecting means, wherein said sheet length detecting means includes a first circuit arranged such that the first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

In a still further preferred aspect of the invention, said pattern comparing means includes second circuits arranged such that each second circuit outputs a signal in response to minute variations in the output of the associated light receiving element when said light receiving element is completely screened, and a second processing means for discriminating the pattern of said sheet by comparing the outputs of said second circuits with said reference pattern data.

In another preferred aspect of the invention, each of said second circuits is connected to one of said first circuits to amplify the output of said first circuit to a predetermined level.

In a further preferred aspect of the invention, said pattern comparing means includes a second circuit arranged such that the second circuit outputs a signal in response to minute variations in the output of the associated light receiving element when said light receiving element is completely screened, and a second processing means for discriminating the pattern of said sheet by comparing the output of said second circuit with said reference pattern data.

In a still further preferred aspect of the invention, said second circuit is connected to said first circuit to amplify the output of said first circuit to a predetermined level.

In another preferred aspect of the invention, said sheet discriminating apparatus further comprises a multiplexer means having a plurality of inputs and a single output for selectively outputting signals to said pattern comparing means, wherein said pattern comparing means includes a second circuit arranged such that the second circuit outputs a signal in response to minute variations in the output of the associated light receiving element when said light receiving element is completely screened, and a second processing means for discriminating the pattern of said sheet by comparing the output of said second circuit with said reference pattern data.

In a further preferred aspect of the invention, said multiplexer means is connected to said first circuits and said second circuit is arranged to amplify the outputs of said first circuits via said multiplexer means to a predetermined level.

In a still further preferred aspect of the invention, said plurality of light emitting elements are arranged in two lines and said plurality of light receiving elements are arranged in two lines such that when viewed in the sheet conveyance direction no space not covered by the light receiving element is observed in the direction perpendicular to the sheet conveyance direction.

In another preferred aspect of the invention, said pattern comparing means is adapted to select the reference pattern data in accordance with the length of said sheet detected by said length detecting means.

In a further preferred aspect of the invention, said reference pattern data comprises pattern data of a characterizing area of the sheet which the kind of sheet can be discriminated, and said pattern comparing means is adapted to preliminarily discriminate the kind of sheet in accordance with the length of the sheet detected by said length detecting means, to select the reference pattern data corresponding to said kind of sheet, and to compare the pattern data of the characterizing area of the sheet with said selected reference pattern data to conduct a final discrimination of the kind of sheet.

The above and other objects and features of the present invention will become apparent from the following description made with the reference to the accompanying drawings.

DESCRIPTION OF THE PREFERRED EMBODIMENTS

Figure 1:
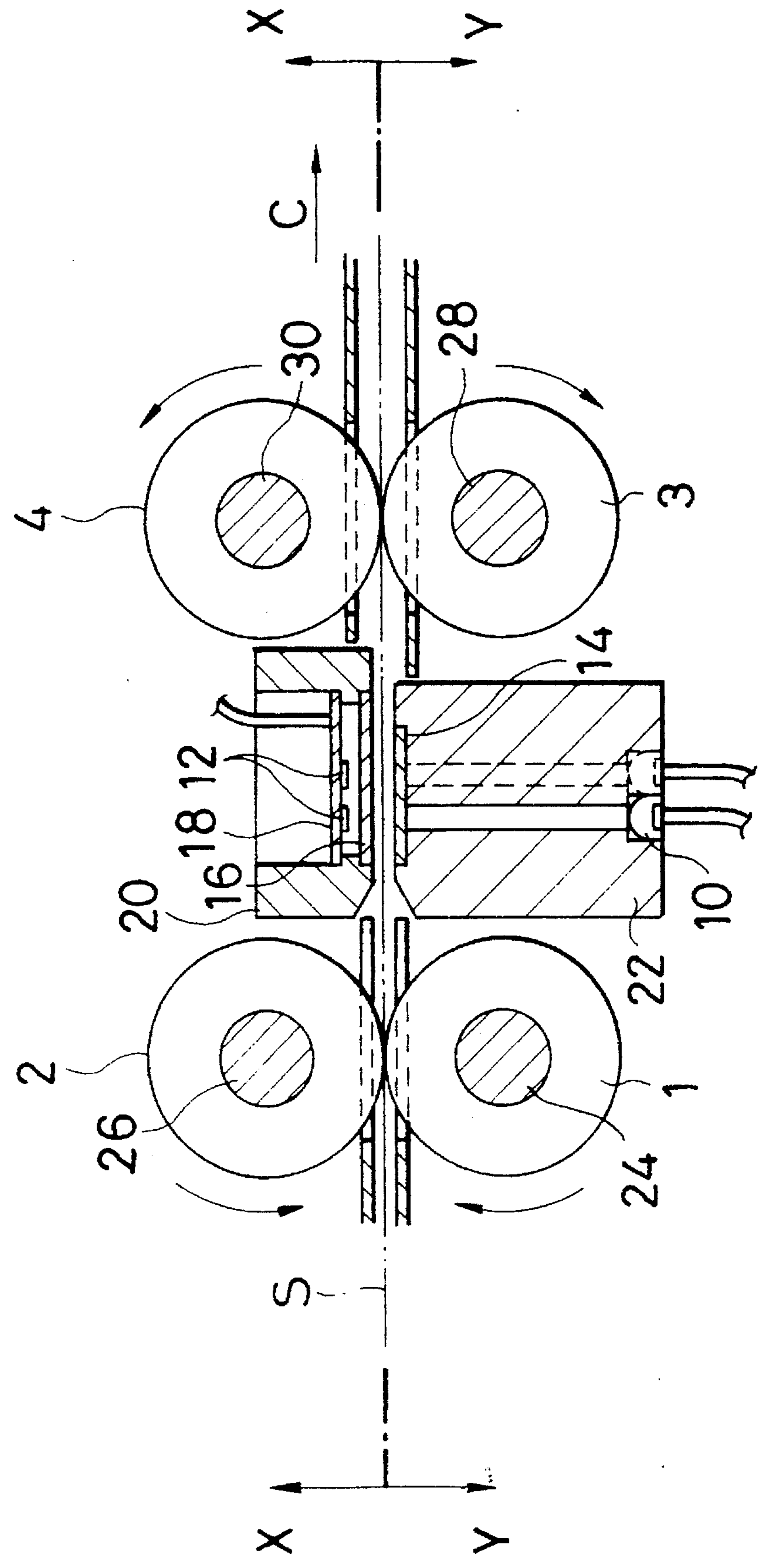
FIG. 1 is a schematic cross sectional view of a sheet discriminating apparatus which is an embodiment of the present invention.

As shown in FIG. 1, a sheet discriminating apparatus for discriminating sheets S comprises two pairs of conveyance rollers 1, 2 and 3, 4 for conveying sheets S in the conveyance direction C, a light emitting section 10 which emits light onto the surface of conveyed sheets S, a light receiving sensor section 12 positioned above the light emitting section 10 for receiving light emitted from the light emitting section 10 and transmitted through the sheets S, a filter 14 for preventing dust or the like from attaching to the light emitting section 10, a filter 16 for ensuring that only the light from directly opposite the light receiving sensor section 12 can be transmitted therethrough and for preventing dust or the like from attaching to the light receiving sensor section 12, a base board 18 for supporting the light receiving sensor section 12, a holder 20 for supporting the filter 16 and the base board 18, and a holder 22 for supporting the light emitting section 10 and the filter 14.

The two pairs of conveyance rollers 1, 2 and 3, 4 are made by baking a high friction material such as rubber around shafts 24, 26 and 28, 30, respectively. The members of each pair of conveyance rollers 1, 2 and the pair of transporting rollers 3, 4 are pressed against each other. The conveyance rollers 1, 3 are drive rollers and the rollers 2, 4 are driven rollers. The conveyance rollers 1, 3 are rotated clockwise by driving means (not shown) at the same rate. As a result, the conveyance rollers 2, 4 are rotated counterclockwise. A rotary encoder (not shown) is mounted on the shaft 26 to detect the number of rotation of the shaft 26.

As shown in FIG. 1, the light receiving sensor section 12 is mounted on the base board 18, which is mounted on the holder 20. The filter 16 is made of a transparent glass or acrylic plate and is mounted on the holder 20 at a distance from the light receiving sensor section 12. The filter 16 prevents dust or the like from attaching to the light receiving sensor section 12.

The filter 14 is made of a transparent glass or acrylic plate, and is mounted on the surface of the holder 22 to prevent dust or the like form attaching to the light emitting section

10.

Figure 2:
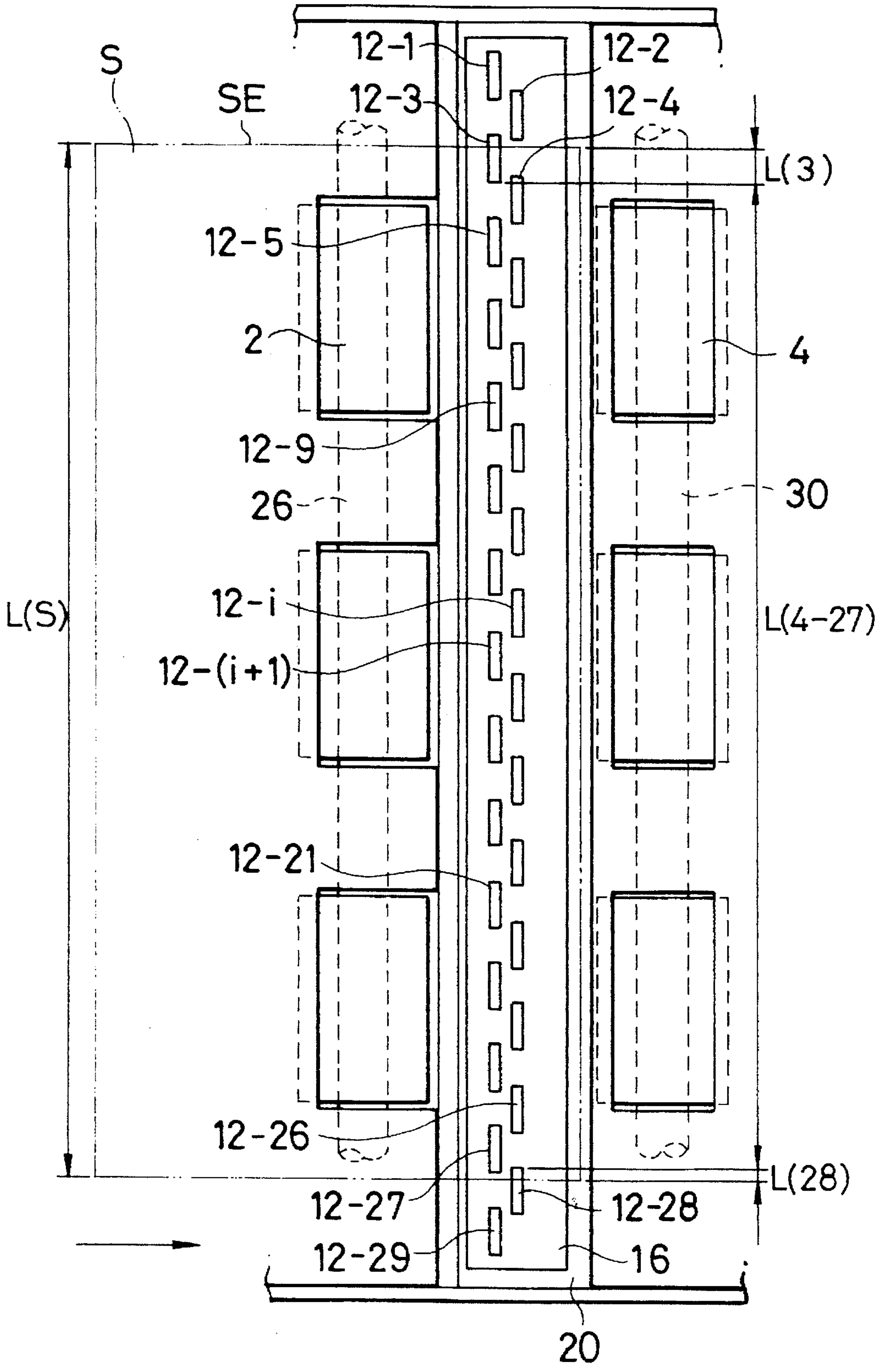
FIG. 2 is a schematic cross sectional view taken along line X—X in FIG. 1.
Figure 3:
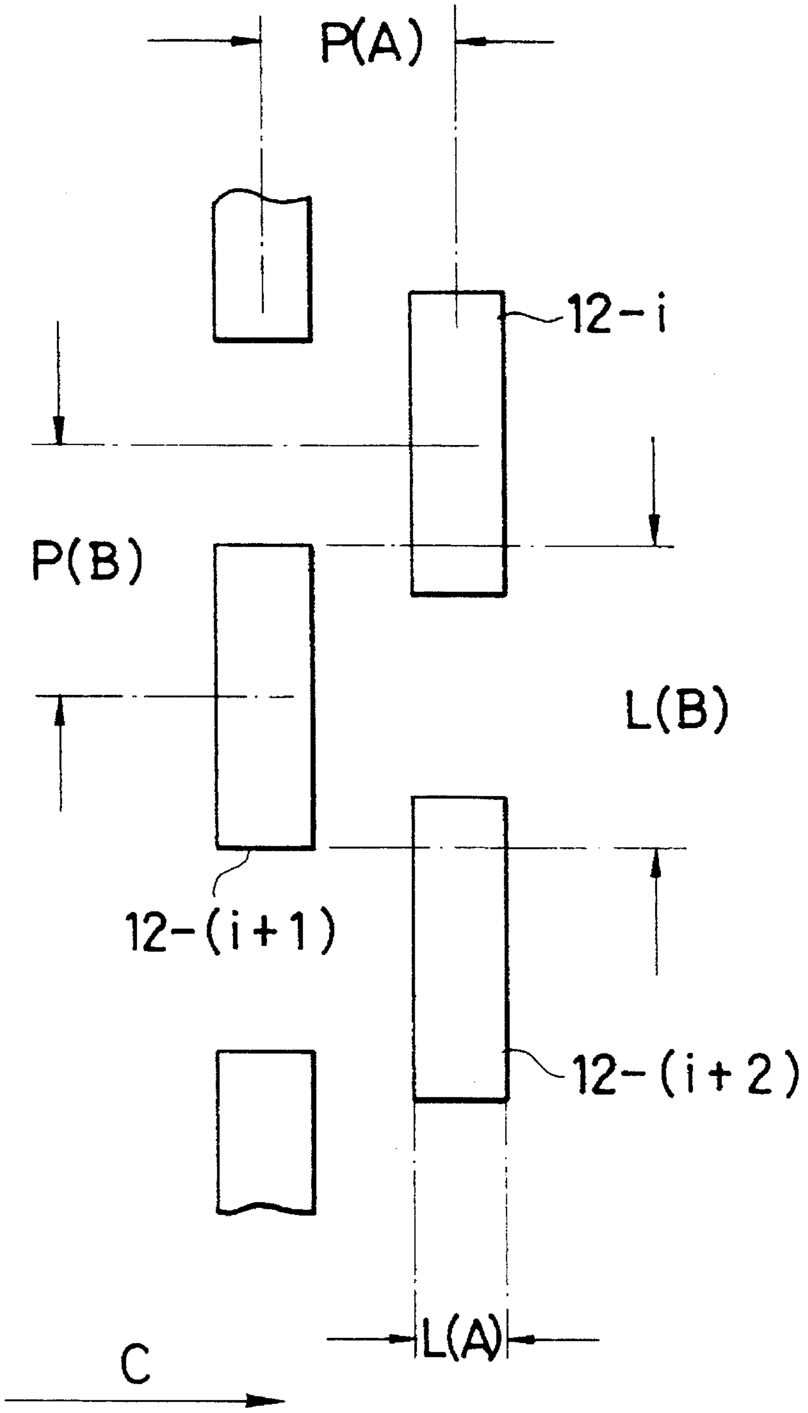
FIG. 3 is a schematic enlarged partial view of a light receiving sensor section of FIG. 2.

FIG. 2 is a schematic cross sectional view taken along line X—X in FIG. 1, and FIG. 3 is a schematic enlarged partial view of the light receiving sensor section 12. In this embodiment, the light receiving sensor section 12 comprises twenty-nine light receiving sensors 12-1 to 12-29. The light receiving sensors 12-i (wherein integer "i" equals 1 to 29), each of which has a rectangular lateral cross section, are staggered in two lines. Each light receiving sensor 12-i is constituted as a photoelectric device such as a photodiode which converts received light into a voltage proportional to the light intensity. As best shown in FIG. 3, each of the light receiving sensors 12-i has a length L(A), e.g. 1.6 mm, in the conveyance direction C and a length L(B), e.g. 7 mm, in the direction perpendicular to the conveyance direction C. Adjacent light receiving sensors are disposed at an interval P(A), e.g. 3.5 mm, in the conveyance direction C and at an interval P(B), e.g. 6 mm, in the direction perpendicular to the conveyance direction C. The relationship between P(B) and L(B) is set to be P(B)<L(B) or P(B)=L(B). Accordingly, the side edge SE of the conveyed sheet S always passes above one of the light receiving sensors 12-i when it is conveyed. The portions of the filter 16 mounted on the holder 20 other than those which face the light receiving sensors 12-1 to 12-29 are printed with a silkscreen or applied with a seal overlay. Therefore, the light transmitted through the sheet S can be transmitted only through the portions facing the light receiving sensors 12-1 to 12-29.

Figure 4:
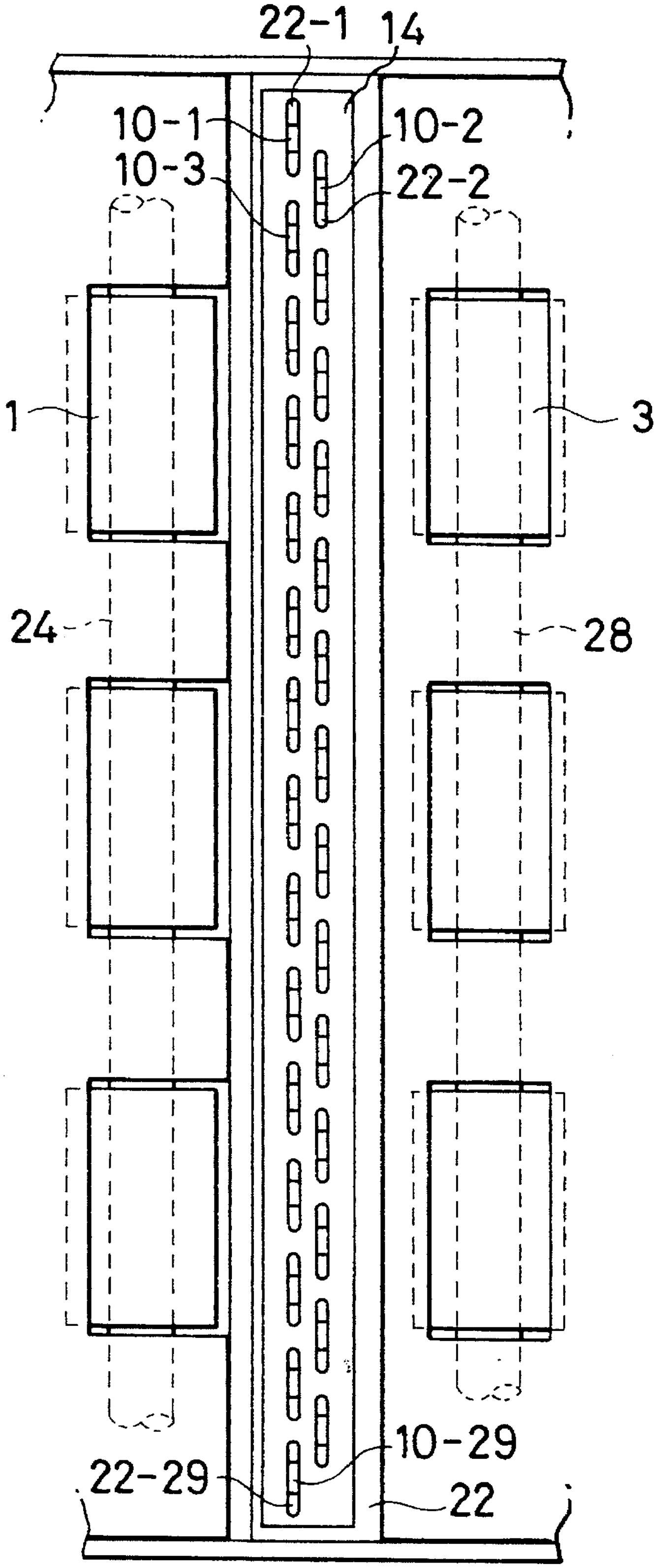
FIG. 4 is a schematic cross sectional view taken along line Y—Y in FIG. 1.

The light emitting section 10 is arranged to face the light receiving sensor section 12. FIG. 4 is a schematic cross sectional view taken along line Y—Y in FIG. 1. As shown in FIG. 4, the light emitting section 10 comprises twenty-nine light emitting elements 10-1 to 10-29. The light emitting elements 10-i (wherein integer "i" equals 1 to 29), each of which has a rectangular lateral cross section, are staggered in two lines such that each of the light emitting elements 10-i faces an associated one of the light receiving sensor elements 12-i and the light emitting elements 10-i and the light receiving sensor elements 12-i are positioned symmetrically with respect to the filters 14, 16. As described later, the amount of light emitted from each light emitting element 10-i can be independently adjusted.

In this embodiment, each of the light emitting elements 10-i emits light having a large half-width. Since the light emitted from a light emitting element does not consist of parallel rays but generally has a certain half-width, even in a single light receiving sensor, the received light intensity may differ between different areas thereof (e.g., between the central portion of the light receiving sensor and the end portion thereof). Accordingly, in this embodiment, light emitting elements which emit light having as large a half-width as possible are used in order to make the density of light received by a single light receiving sensor uniform so as to uniformly project light onto the whole area of the light receiving sensor 12-i. Although the distance between the light emitting section 10 and the light receiving sensor section 12 is determined depending upon the light intensity, it is preferable to set it as long as practicable for uniformly projecting light onto each of the light receiving sensors 12-i. In this embodiment, the distance between the light emitting section 10 and the light receiving sensor section 12 is set to be 30 mm. As shown in FIG. 4, apertures 22-1 to 22-29 are formed on the portions of the surface of the holder 22 facing the light receiving sensors 12-1 to 12-29 and the light receiving sensors 12-1 to 12-29 are staggered in two lines. Consequently, even though a light emitting element 10-i emits light of a large half-width, it is ensured that the light emitting from the light emitting element 10-i is received only by the associated light receiving sensor 12-i.

Figure 5:
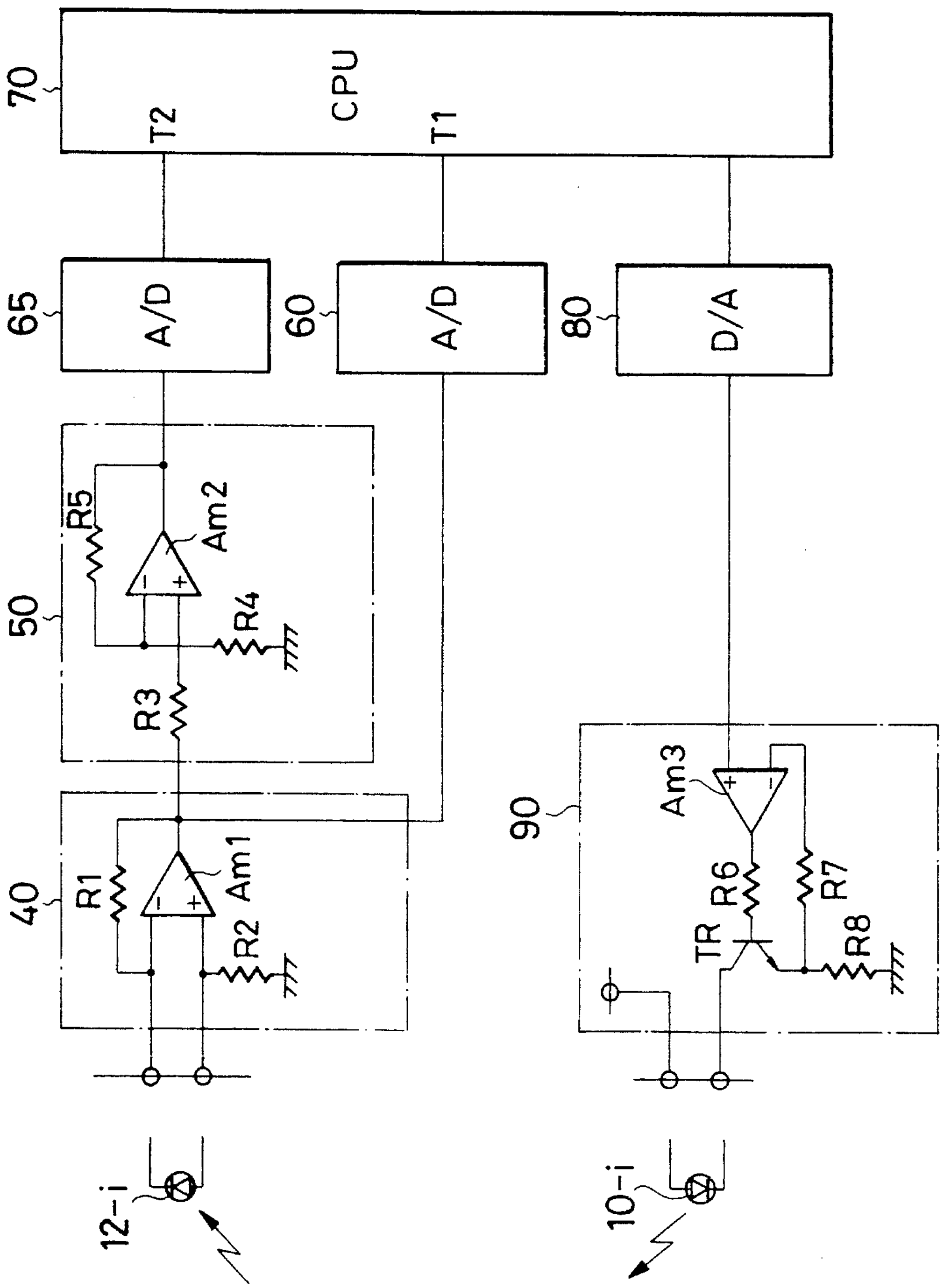
FIG. 5 is a block diagram of a control circuit of a sheet discriminating apparatus which is an embodiment of the present invention.

FIG. 5 is a block diagram of a control circuit for the light receiving sensor 12-i of the sheet discriminating apparatus. As shown in FIG. 5, the control circuit includes a first circuit 40, a second circuit 50, analog-digital converters (hereinafter referred to as "A/D converters") 60, 65, a central processing unit (hereinafter referred to as "CPU") 70, a digital-analog converter (hereinafter referred to as "D/A converter") 80, and a received light level regulating circuit 90. Each light receiving sensor 12-i is connected to the first circuit 40, which is connected to the second circuit 50 and is also connected to the A/D converter 60. The A/D converter 60 is connected to a first terminal T1 of the CPU 70. The second circuit 50 is connected to the A/D converter 65, which is connected to a second terminal T2 of the CPU 70. The received light level regulating circuit 90 is adapted for controlling the driving current for the light emitting element 10-i and is connected to the D/A converter 80 which is connected to the CPU 70. A processing unit consisting of a first circuit 40, a second circuit 50, A/D converters 60, 65, a D/A converter 80 and a received light regulating circuit 90 is provided for each pair of the light emitting elements 10-i and light receiving sensors 12-i, whereas the CPU 70 is common to all units.

When a light receiving sensor 12-i receives the light emitted from the associated light emitting element 10-i, it outputs a signal to the first circuit 40. The first circuit 40 includes an amplifier Am1 and resistors R1, R2 each having a prescribed resistance value, and has a small amplification factor. The first circuit 40 is adjusted to output a reference voltage (e.g. 5 V) as a signal when the light receiving sensor 12-i receives the light emitted from the light emitting element 10-i without being screened by the sheet S, and to output a signal of substantially 0 (zero) level (e.g. 0 (zero) V) when the light receiving sensor 12-i receives substantially no light because a sheet S is being conveyed between the filters 14, 16, namely, when the light receiving sensor 12-i is completely screened by the sheet to be discriminated. Consequently, the amount of change in the output voltage of the first circuit 40 between when the light receiving sensor 12-i is not screened by the sheet and when it is screened by the sheet, which is referred to as "a reference voltage variation V(0)," is substantially 5 V. On the other hand, the second circuit 50 includes an amplifier Am2 and resistors R3, R4 and R5 each having a prescribed resistance value and has a large amplification factor. The second circuit 50 is arranged to be able to detect minute variation in the voltage caused by the change in the amount of the light transmitted through the sheet and received by the light receiving sensor 12-i when the light receiving sensor 12-i receives substantially no light, namely, when the light receiving sensor 12-i is completely screened by the sheet S.

Figure 6A:
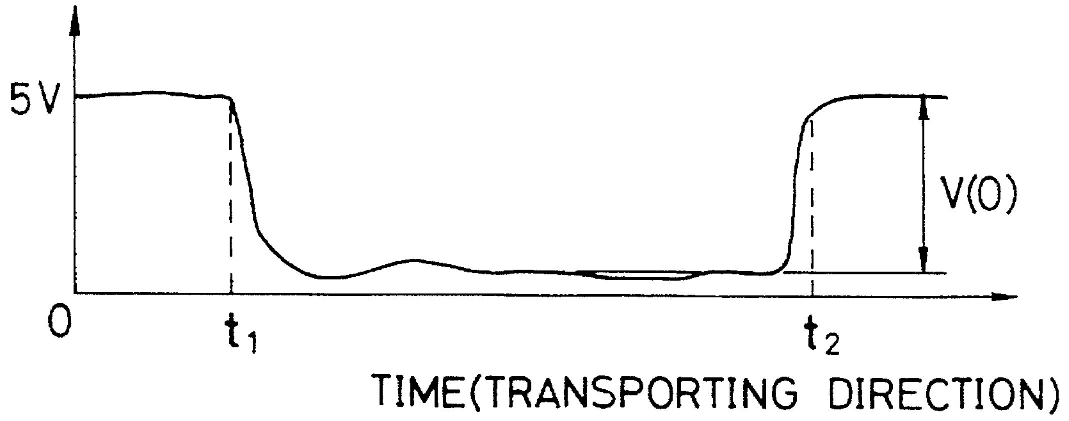
FIGS. 6A, 6B and 6C are graphs showing time series variation of output voltages of a first circuit.
Figure 6B:
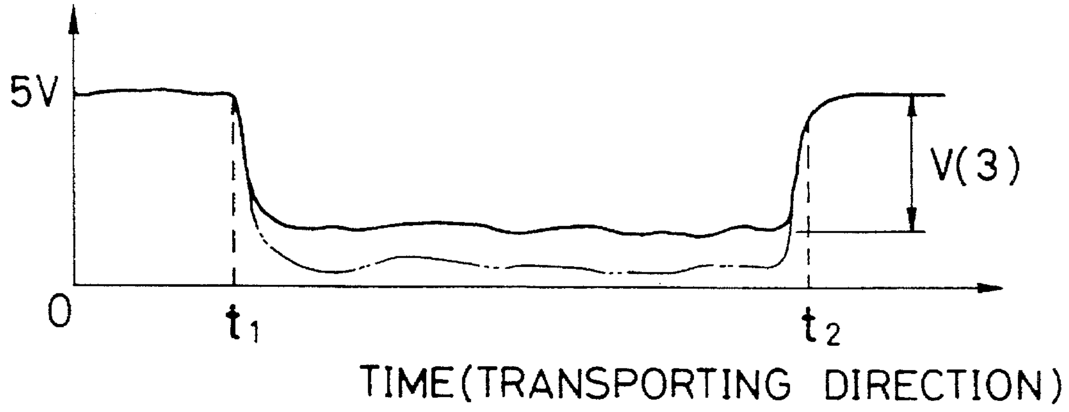
Figure 6C:
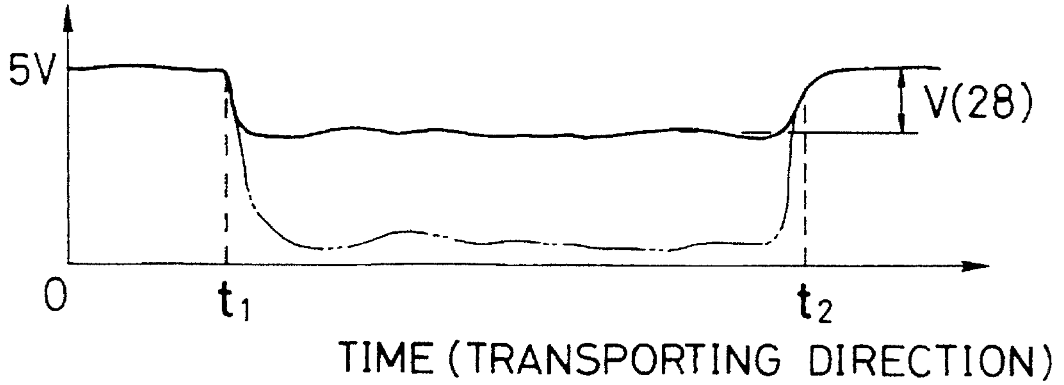

As shown in FIG. 2, when a sheet S of length L(S) in the direction perpendicular to the conveyance direction C is conveyed in the conveyance direction C such that the side edge SE thereof is parallel to the conveyance direction C, the light receiving sensors 12-1, 12-2 and 12-29 are not screened by the sheet S. In this case, the output voltages of the first circuits 40 connected to the light receiving sensors 12-1, 12-2 and 12-29 are 5 V. These output voltages are constant at 5 V, which is to say that the change in the output voltages is 0 (zero) V. On the other hand, the light receiving sensors 12-4 to 12-27 are screened by the sheet S when the sheet S passes thereabove. Accordingly, the output voltages of the first circuits 40 connected to the light receiving sensors 12-4 to 12-27 change as shown in FIG. 6A. More specifically, the output voltages thereof stay at 5 V until time t1 when the front edge of the sheet S reaches the position above the light receiving sensors 12-4 to 12-27. Then, they decrease by the reference voltage variation V(0) and stay at substantially 0 (zero) V until time t2 when the rear edge of the sheet S reaches the position above the light receiving sensors 12-4 to 12-27. After the sheet has passed through the position above the light receiving sensors 12-4 to 12-27, the output voltages of the first circuits 40 connected to the light receiving sensors 12-4 to 12-27 increases to 5 V. Furthermore, the light receiving sensors 12-3, 12-28 are partially screened by the sheet S when the sheet passes thereabove. Accordingly, the output voltages of the first circuits 40 connected to the light receiving sensors 12-3 and 12-28 change as shown in FIGS. 6B and 6C. More specifically, the output voltages stay at levels lower than 5 V from t1 to t2. However, the changes in the output voltages V(3) and V(28) are smaller than the reference voltage variation V(0). The output signal of each first circuit 40 is input to the first terminal T1 of the CPU 70 via the A/D converter 60. The CPU 70 calculates the length of the sheet S to preliminarily discriminate the kind of sheet in accordance with the input signals.

The CPU 70 calculates the length L(3) of the portion of the light receiving sensor 12-3 screened by the sheet S in accordance with the following equation (1).

$$L(3)=L(B)\cdot\{V(3)/V(0)\} \quad (1)$$

Similarly, the CPU 70 calculates the length L(28) of the portion of the light receiving sensor 12-28 screened by the sheet S in accordance with the following equation (2)

$$L(28)=L(B)\cdot\{V(28)/V(0)\} \quad (2)$$

Then, the CPU 70 calculates the length L(4–27) of the portion of the light receiving sensors 12-4 to 12-27 screened by the sheet S in accordance with the following equation (3) and then the whole length L(S) of the sheet S can be calculated in accordance with the following equation (4).

$$L(4\text{–}27)=P(B)\cdot(27\text{-}4+1)-\{L(B)-P(B)\} \quad (3)$$

$$L(S)=L(3)+L(28)+L(4\text{–}27) \quad (4)$$

Figure 7:
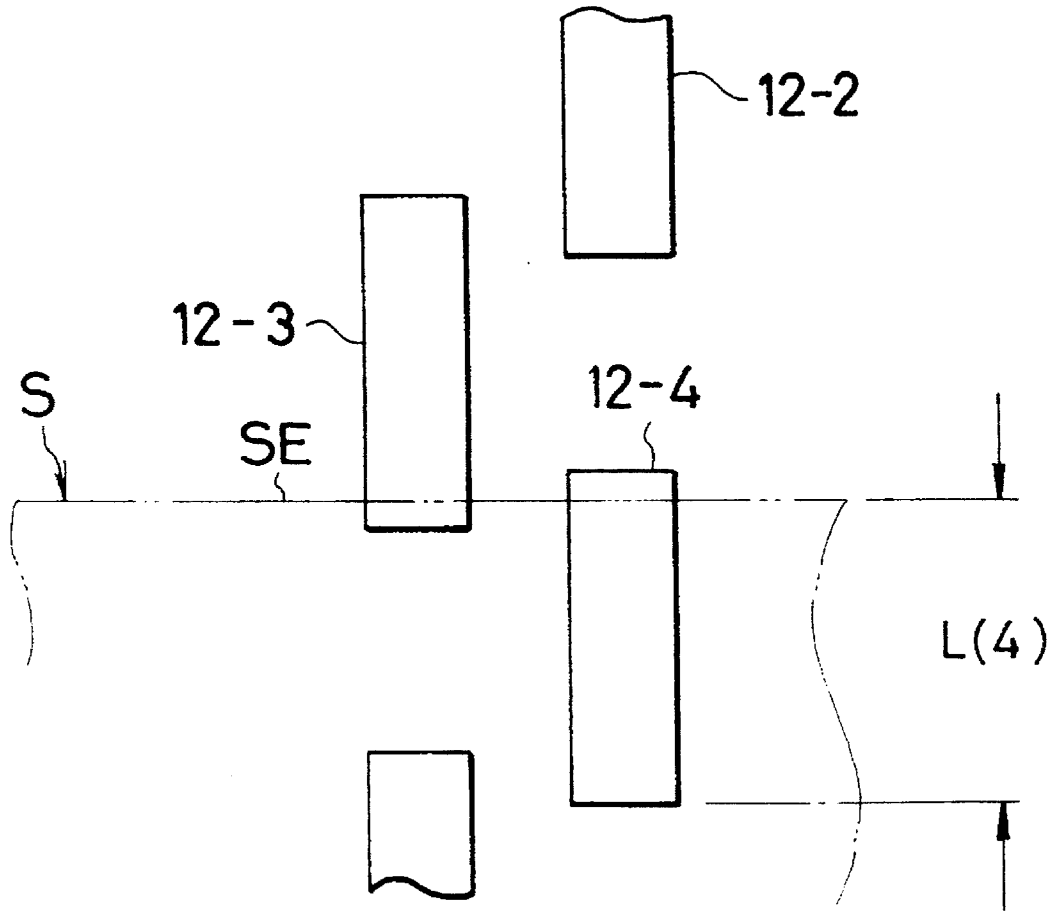
FIG. 7 is a schematic enlarged partial view of light receiving sensors where two light receiving sensors on different lines are screened by the side edge of the sheet.

As shown in FIG. 7, if two light receiving sensors in different lines, for example the light receiving sensors 12-3 and 12-4, are partially screened by one side edge SE of the sheet S, the whole length L(S) of the sheet S can be calculated based upon the length L(4) of the portion of the more inwardly positioned light receiving sensor 12-4 screened by the sheet S.

On the other hand, when the sheet S is undesirably conveyed with the side edge thereof not parallel to the conveyance direction C, the CPU 70 corrects the calculated length of the sheet as follows.

Initially, the angle θ of the side edge SE of the sheet S with respect to the conveyance direction C is calculated based upon the output signals of two light receiving sensors which are completely screened by the sheet S passing thereabove. In the case shown in FIG. 8A, the CPU 70 determines the time when the change in the output voltage of the first circuit 40 which receives the output signal the light receiving sensor 12-9 becomes (½)·V(0) and the time when the change in the output voltage of the first circuit 40 which receives the output signal from the light receiving sensor 12-21 becomes (½)·V(0). The CPU 70 then calculates the deviation "n" shown in FIG. 8A based upon the interval between the determined times and encoder pulses from the rotary encoder (not shown) mounted on the shaft 26. Supposing that "d" is the distance between the light receiving sensor 12-9 and 12-21 in the direction perpendicular to the conveyance direction C, the angle $\theta=\tan^{-1}(n/d)$.

Figure 8B:
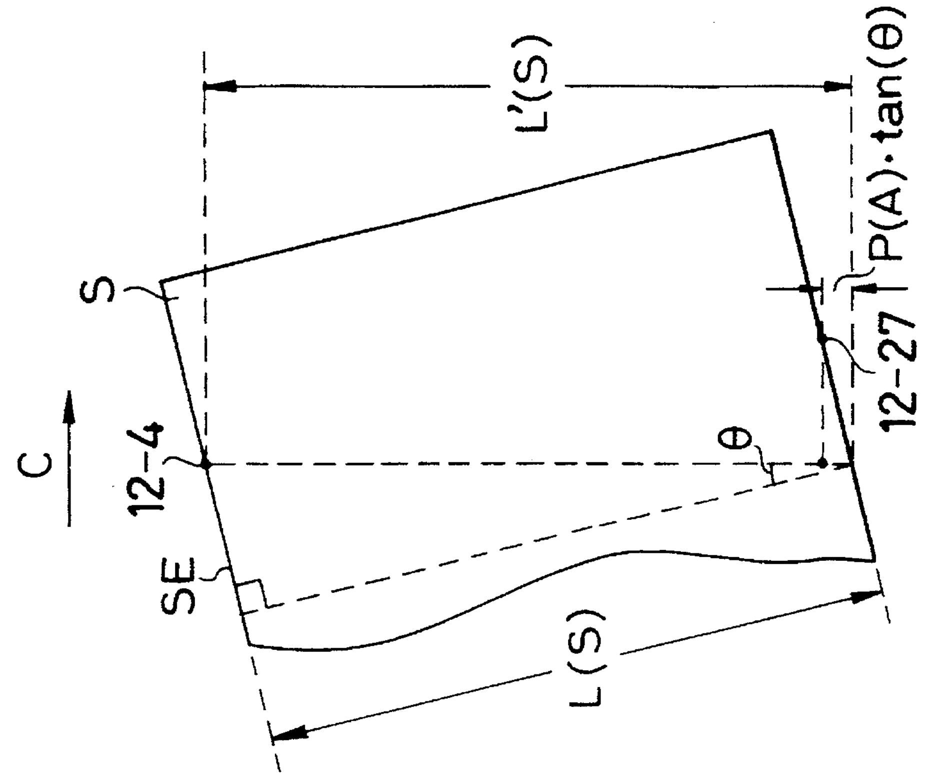
FIGS. 8A and 8B are schematic views for describing the detection of the length of a sheet when the sheet is undesirably transported.
Figure 8A:
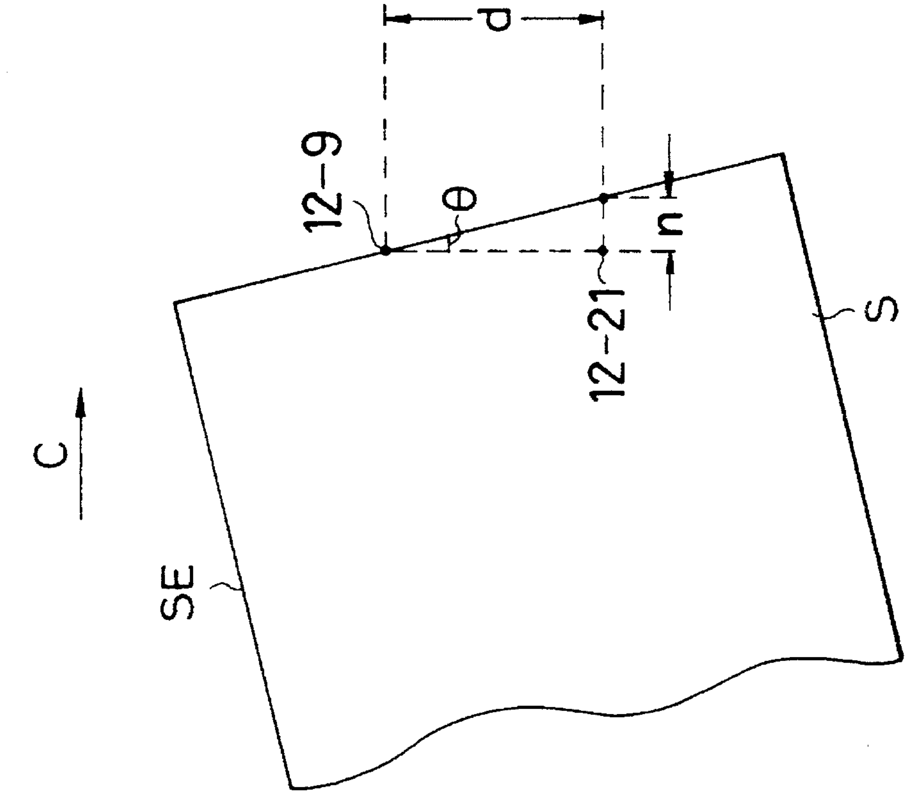

Similarly to the case of FIG. 2, in the case where the light receiving sensors 12-4 and 12-27 are partially screened by the sheet S, the CPU 70 calculates the length L'(S) of the sheet in the direction perpendicular to the conveyance direction C in accordance with the following equation (5).

$$L'(S)=L(3)+L(28)+L(4\text{–}27)+P(A)\cdot\tan(\theta) \quad (5)$$

wherein P(A)·tan(θ) is the deviation caused by the fact that the light receiving sensors 12-4 and 12-7 are positioned in different lines. Consequently, the CPU 70 calculates the actual length L(S) of the sheet S as shown in FIG. 8B in accordance with the following equation (6).

$$L(S)=L'(S)\cdot\cos(\theta)=L'(S)\cdot\cos(\tan^{-1}(n/d)) \quad (6)$$

If the light receiving sensors which are partially screened by the sheet S are positioned in same line, P(A)·tan(θ)=0.

In this manner, the CPU 70 calculates the length L(S) of the sheet S and, via the A/D converter 65 and the second terminal T2, receives the output signals from the second circuits 50 each connected to one of the light receiving sensors 12-1 to 12-29. After storing the received signals as pattern data in a random access memory (hereinafter referred to as "RAM") (not shown), the CPU 70 then preliminarily discriminates the kind of sheet based upon the length L(S) of the sheet S with reference to data stored in a read only memory (hereinafter referred to as "ROM") (not shown), and reads the data on the characterizing area of the sheet preliminarily discriminated. The characterizing area is determined in advance as an area in the sheet suitable for discriminating the kind of sheet, and the position of the area in the sheet is stored in the ROM for each kind of sheet. The pattern data corresponding to the characterizing area are also stored as reference pattern data in the ROM for every kind of sheet. In accordance with the kind of sheet preliminarily discriminated based upon the length L(S), the CPU 70 reads from the RAM the pattern data of the sheet S corresponding to the characterizing area read from the ROM. Then, the CPU 70 reads the reference pattern data of the kind of sheet preliminarily discriminated from among the reference pattern data stored in the ROM for each kind of sheet and effects pattern matching by comparing the reference pattern data with the pattern data of the sheet S read from the RAM so as to make a final discrimination of the kind of sheet.

Figure 9A:
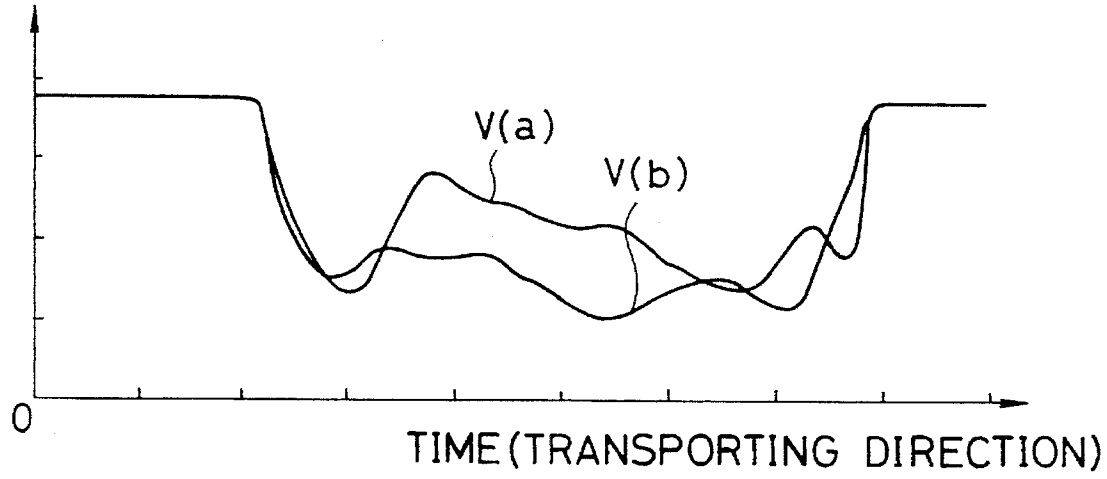
FIGS. 9A and 9B are graphs showing time series variations of output voltages of a second circuit.
Figure 9B:
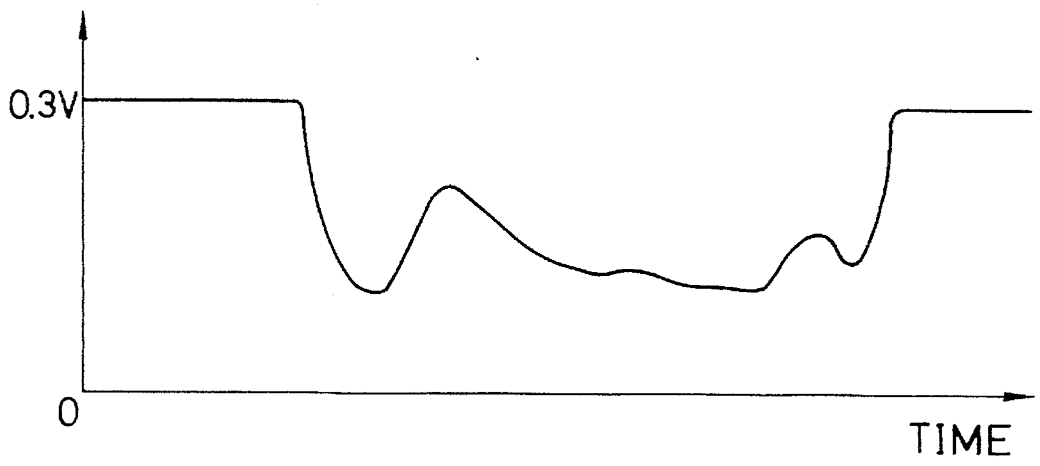

FIG. 9A shows time series variations of the output voltage V of a second circuit 50 which is connected to a light receiving sensor positioned apart from the side edge SE of the sheet S at a predetermined distance. In FIG. 9A, the curve V(a) shows the change in the output voltage V when a Japanese 10,000 yen bill is conveyed, while the curve V(b) shows the change when a Japanese 5,000 yen bill is conveyed. The pattern data of the sheet S are generated from the time series variations of the output voltages of the second circuits 50 each connected to one of the light receiving sensors, and are stored in the RAM.

In order to prevent decrease in the accuracy with which the length and pattern can be detected owing to variance in the sensitivity of the light receiving elements 12-i, the CPU 70 feeds control signals to the respective received light level regulating circuits 90 via the associated D/A converters 70. Each of the received light level regulating circuits 90 controls the driving current for the associated light receiving sensor 12-i by controlling the base current of a transistor TR supplied from an amplifier Am3 such that each light receiving sensor 12-i associated with a the light emitting element 10-i outputs the same voltage under the same condition.

The present invention has thus been shown and described with reference to specific embodiments. However, it should be noted that the present invention in no way limited to the details of the described arrangements but changes and modifications may be made without departing from the scope of the appended claims.

Figure 10:
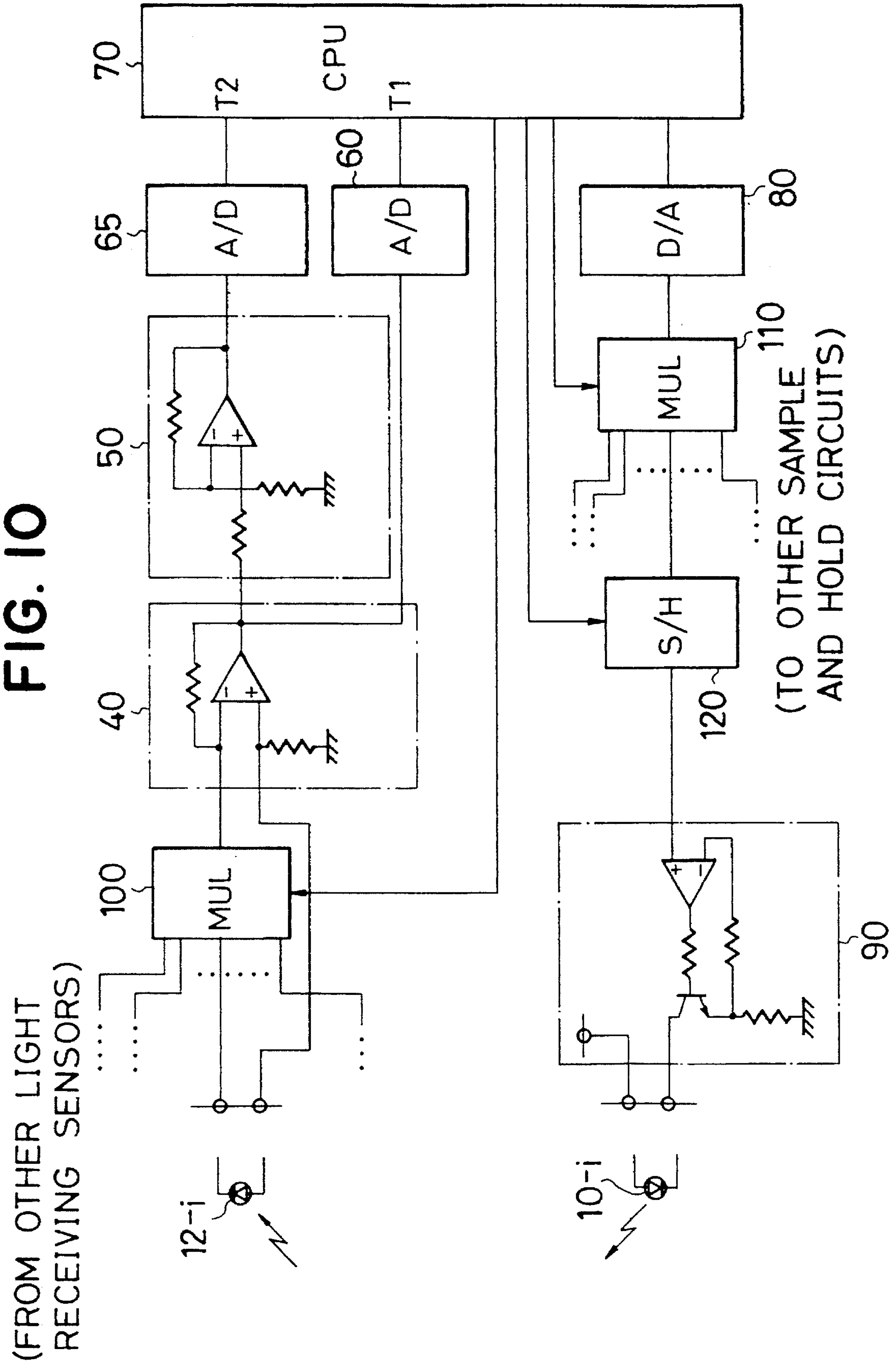
FIG. 10 is a block diagram of a control circuit of a sheet discriminating apparatus which is another embodiment of the present invention.

For example, although in the above described embodiment, the first circuit 40, the second circuit 50 and the A/D converters 60, 65 are provided separately for each of the light receiving sensors 12-i, it is possible to provide only a single first circuit 40, second circuit 50, A/D converter 60, and A/D converter 65 and to connect the first circuit 40 to a multiplexer 100 which is connected to the light receiving elements 12-i, as shown in FIG. 10. In this case, the multiplexer 100 is driven by use of a time sharing method. Similarly, although in the above described embodiment, the D/A converter 80 and the received light level regulating circuit 90 are provided separately for each of the light emitting elements 10-i, it is possible to use a multiplexer 110 and sample and hold circuits 120 to accomplish the same function as in the above described embodiment.

Further, the shape and the size of each light emitting element 10-i and of each light receiving sensor 12-i, the distance between adjacent light emitting elements, and the distance between adjacent light receiving sensors are not limited to those in the above described embodiment. Similarly, the number of the light emitting elements and the light receiving sensors is not limited.

Furthermore, although in the above described embodiment, the light emitting elements 10-1 to 10-29 and the light receiving sensors 12-1 to 12-29 are regularly arranged, this is not necessary and they need only be arranged such that at least one light receiving sensor 12-i is screened from the light emitted from the associated light emitting element 10-i by the side edge SE of the sheet S.

Moreover, although in the above described embodiment, the light emitting elements 10-1 to 10-29 and the light receiving sensors 12-1 to 12-29 are arranged in two lines, this is not necessary and they may be arranged in three or more lines insofar as at least one light receiving sensor 12-i is screened from the light emitted from the associated light emitting element 10-i with the side edge SE of the sheet S.

Further, in the above described embodiment, the CPU 70 preliminarily discriminates the kind of sheet by calculating the length of the sheet S, reads the pattern data on a specific characterizing area of the sheet S in accordance with the result of the preliminary discrimination and the reference pattern data of the characterizing area for effecting pattern matching so as to make a final discrimination of the kind of sheet. However, it is possible to store the whole pattern data of the sheets S as the reference pattern data for the kinds of sheet and to have the CPU preliminarily discriminate the kind of sheet in accordance with the length L(S) and read the reference pattern data in accordance with the result of the preliminary discrimination, thereby effecting pattern matching by comparing the whole pattern data of the sheet S with the reference pattern data so as to make a final discrimination of the kind of sheet.

Furthermore, the sheet discriminating apparatus may be designed to compare the pattern data of the sheet S with the reference pattern data independently from the preliminary discrimination of the kind of sheet in accordance with the length of the sheet S and to discriminate the kind of sheet in accordance with the result of both the comparison and the discrimination.

Moreover, in the above described embodiment, the first circuit 40 is adjusted such that it outputs a reference voltage of 5 V as a signal when the associated light receiving sensor 12-i receives the light emitted from the light emitting element 10-i without being screened by the sheet S, and outputs a signal of substantially 0 (zero) V when the associated light receiving sensor 12-i receives substantially no light. Therefore, the reference voltage variation V(0) is substantially 5 V. However, since it is sufficient for the reference voltage variation V(0) to be constant for the material of the sheets to be discriminated, it is not necessary for the reference voltage variation V(0) to be 5 V or for the output signal to be substantially 0 (zero) V when the light receiving sensor 12-i receives substantially no light.

Further, in the present invention, the respective means need not necessarily be physical means and arrangements whereby the function of the respective means is accomplished by software fall within the scope of the present invention. In addition, the function of a single means may be accomplished by two or more physical means and the functions of two or more means may be accomplished by a single physical means.

I claim:

1. A sheet discriminating apparatus for discriminating sheets by kind comprising:

a plurality of light emitting elements arranged in a plurality of lines in the direction perpendicular to a sheet conveyance direction, a plurality of light receiving elements each being positioned to face an associated one of said light emitting elements, each of said light receiving elements receiving light emitted from the associated light emitting element, said light receiving elements being arranged such that at least one light receiving element receives light emitted from said associated light emitting element and is partially screened by the side edge of the conveyed sheet, a sheet length detecting means for detecting the length of the sheet in the direction perpendicular to said conveyance direction based upon the ratio of the outputs of the light receiving elements which are completely screened by the conveyed sheet to those of other light receiving elements which are partially screened by said conveyed sheet, and a pattern comparing means for determining pattern data of said sheet in accordance with time series outputs of said light receiving elements and for comparing said pattern data with a reference pattern data selected from a plurality of reference pattern data each corresponding to a kind of sheet, said kind of sheet being discriminated in accordance with the length of the sheet detected by said sheet length detecting means and the result obtained by said pattern comparing means.

2. A sheet discriminating apparatus according to claim 1, wherein said plurality of light emitting elements are arranged in two lines and said plurality of light receiving elements are arranged in two lines such that when viewed in the sheet conveyance direction no space not covered by a light receiving element is observed in the direction perpendicular to the sheet conveyance direction.

3. A sheet discriminating apparatus according to claim 1, wherein said pattern comparing means is adapted to select the reference pattern data in accordance with the length of said sheet detected by said length detecting means.

4. A sheet discriminating apparatus according to claim 1, wherein said reference pattern data comprises pattern data of a characterizing area of the sheet from which the kind of sheet can be discriminated, and said pattern comparing means is adapted to preliminarily discriminate the kind of sheet in accordance with the length of the sheet detected by said length detecting means, to select the reference pattern data corresponding to said kind of sheet, and to compare the pattern data of the characterizing area of the sheet with said selected reference pattern data to conduct a final discrimination of the kind of sheet.

5. A sheet discriminating apparatus according to claim 1, wherein said pattern comparing means includes second circuits arranged such that each second circuit outputs a signal in response to minute variations in the output of the associated light receiving element when said light receiving element is completely screened, and a second processing means for discriminating the pattern of said sheet by comparing the outputs of said second circuits with said reference pattern data.

6. A sheet discriminating apparatus according to claim 5, wherein said sheet length detecting means includes first circuits arranged such that each first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

7. A sheet discriminating apparatus according to claim 6, wherein each of said second circuits is connected to one of said first circuits to amplify the output of said first circuit to a predetermined level.

8. A sheet discriminating apparatus according to claim 1, said sheet discriminating apparatus further comprising a multiplexer means having a plurality of inputs and a single output for selectively outputting signals to said pattern comparing means, wherein said pattern comparing means includes a second circuit arranged such that the second circuit outputs a signal in response to minute variations in the output of the associated light receiving element when said light receiving element is completely screened, and a second processing means for discriminating the pattern of said sheet by comparing the output of said second circuit with said reference pattern data.

9. A sheet discriminating apparatus according to claim 8, wherein said sheet length detecting means includes first circuits arranged such that each first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

10. A sheet discriminating apparatus according to claim 9, wherein said multiplexer means is connected to said first circuits and said second circuit is arranged to amplify the outputs of said first circuits via said multiplexer means to a predetermined level.

11. A sheet discriminating apparatus according to claim 1, wherein said sheet length detecting means is arranged so as to detect the lengths of the portions of the light receiving elements which are partially screened by said conveyed sheet in accordance with said ratios of the outputs of the light receiving elements which are completely screened by the conveyed sheet to those of said light receiving elements which are partially screened by said conveyed sheet, and to detect the length of said sheet in the direction perpendicular to said conveyance direction in accordance with the lengths of said light receiving elements which are completely screened by said conveyed sheet and said the lengths of the portions.

12. A sheet discriminating apparatus according to claim 11, wherein said sheet length detecting means includes first circuits arranged such that each first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

13. A sheet discriminating apparatus according to claim 12, wherein said pattern comparing means includes second circuits arranged such that each second circuit outputs a signal in response to minute variations in the output of the associated light receiving element when said light receiving element is completely screened, and a second processing means for discriminating the pattern of said sheet by comparing the outputs of said second circuits with said reference pattern data.

14. A sheet discriminating apparatus according to claim 13, wherein each of said second circuits is connected to one of said first circuits to amplify the output of said first circuit to a predetermined level.

15. A sheet discriminating apparatus according to claim 11, said sheet discriminating apparatus further comprising a multiplexer means having a plurality of inputs and a single output for selectively outputting signals from said light receiving elements to said sheet length detecting means, wherein said sheet length detecting means includes a first circuit arranged such that the first circuit outputs substantially 0 (zero) level when the associated light receiving element is completely screened by said conveyed sheet, and that it outputs a signal in accordance with the length of the portion of the associated light receiving element which is partially screened when the associated light receiving element is partially screened by the conveyed sheet, and a first processing means which can calculate the length of the light receiving elements which are partially screened by the conveyed sheet and the length of the light receiving elements which are completely screened by said conveyed sheet.

16. A sheet discriminating apparatus according to claim 15, wherein said pattern comparing means includes a second circuit arranged such that the second circuit outputs a signal in response to minute variations in the output of the associated light receiving element when said light receiving element is completely screened, and a second processing means for discriminating the pattern of said sheet by comparing the output of said second circuit with said reference pattern data.

17. A sheet discriminating apparatus according to claim 16, wherein said second circuit is connected to said first circuit to amplify the output of said first circuit to a predetermined level.

* * * * *